US010915632B2

(12) United States Patent
Goldman et al.

(10) Patent No.: US 10,915,632 B2
(45) Date of Patent: Feb. 9, 2021

(54) HANDLING OF REMOTE ATTESTATION AND SEALING DURING CONCURRENT UPDATE

(71) Applicant: INTERNATIONAL BUSINESS MACHINES CORPORATION, Armonk, NY (US)

(72) Inventors: Kenneth Alan Goldman, Norwalk, CT (US); Jakob Christopher Lang, Tuebingen (DE); Benno Schuepferling, Boeblingen (DE); Dennis Zeisberg, Bielefeld (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 16/200,835

(22) Filed: Nov. 27, 2018

(65) Prior Publication Data

US 2020/0167474 A1 May 28, 2020

(51) Int. Cl.
*G06F 21/57* (2013.01)
*H04L 9/32* (2006.01)
*G06F 9/445* (2018.01)
*G06F 8/65* (2018.01)

(52) U.S. Cl.
CPC .............. *G06F 21/572* (2013.01); *G06F 8/65* (2013.01); *G06F 9/44505* (2013.01); *H04L 9/3236* (2013.01); *H04L 2209/38* (2013.01)

(58) Field of Classification Search
CPC ...... G06F 21/572; G06F 8/65; G06F 9/44505; H04L 9/3236; H04L 2209/38

USPC .............................................. 713/2
See application file for complete search history.

(56) References Cited

U.S. PATENT DOCUMENTS 8,161,285 B2 4/2012 Ellison et al.
8,566,574 B2 10/2013 Shriver
8,869,264 B2 * 10/2014 Mackintosh .......... G06F 21/575
713/2

(Continued)

OTHER PUBLICATIONS

Information Security Stack Exchange "Using the TPM module to measure boot process and remote attestation"; retrieved at: https://security.stackexchange.com/questions/174587/using-the-tpm-module-to-measure-boot-process-and-remote-attestation; retrieved on Jul. 9, 2018; 1 pg.

(Continued)

*Primary Examiner* — Brian T Misiura
(74) *Attorney, Agent, or Firm* — Cantor Colburn LLP; Steven Chiu

(57) ABSTRACT

According to one or more embodiments of the present invention, an example computer-implemented method for measuring concurrent updates in a security coprocessor includes using a first set of platform configuration registers of the security coprocessor to store and extend measurement of a code-load used during a boot sequence of a computing device. The method further includes using a second set of platform configuration registers of the security coprocessor to store and extend measurement of configuration parameters of the code-load used during the boot sequence. The method further includes using a third set of platform configuration registers of the security coprocessor to store and extend measurements of a concurrent update that changes the code-load that was used during the boot sequence.

25 Claims, 12 Drawing Sheets

(56) References Cited

U.S. PATENT DOCUMENTS

| | | | |
|---|---|---|---|
| 9,026,771 B2* | 5/2015 | Ibrahim | G06F 21/57 |
| | | | 709/219 |
| 9,087,198 B2* | 7/2015 | Ekberg | G06F 21/57 |
| 9,436,827 B2 | 9/2016 | Mackintosh et al. | |
| 9,924,366 B2* | 3/2018 | Schmidt | H04W 12/10 |
| 10,013,565 B2* | 7/2018 | Martinez | G06F 21/575 |
| 10,523,427 B2* | 12/2019 | Vijayakumar | H04L 9/0822 |
| 2008/0046752 A1 | 2/2008 | Berger et al. | |
| 2012/0311315 A1* | 12/2012 | Ekberg | G06F 21/57 |
| | | | 713/2 |
| 2016/0162285 A1 | 6/2016 | Gilbert et al. | |
| 2020/0097661 A1* | 3/2020 | Block | H04L 63/126 |
| 2020/0099536 A1* | 3/2020 | Block | G06F 21/572 |

OTHER PUBLICATIONS

Schellekens et al. "Remote attestation on legacy operating systems with trusted platform modules", Science of Computer Programming 74 (2008) pp. 13-22.

* cited by examiner

HANDLING OF REMOTE ATTESTATION AND SEALING DURING CONCURRENT UPDATE

BACKGROUND

The present invention relates to computing technology, and particularly a computer system with a trusted platform module for handling of remote attestation and sealing during concurrent updates.

Computer systems execute computer programs that may utilize dependent data, such as libraries, during program execution. The computer system may also include a trusted computing environment that assures the integrity of the computer programs and their dependent data. The trusted computing environment may be managed by an integrity measurement module, which checks a computer program's integrity prior to executing the computer program.

Consumer and enterprise computing systems can contain trusted platform modules and associated trusted firmware code stored in ROMs that are presumed to be trustworthy. This basis of trusted firmware is used as the secure foundation for many up-stack security technologies.

SUMMARY

According to one or more embodiments of the present invention, an example computer-implemented method for measuring concurrent updates in a security coprocessor includes using a first set of platform configuration registers of the security coprocessor to store and extend measurement of a code-load used during a boot sequence of a computing device. The method further includes using a second set of platform configuration registers of the security coprocessor to store and extend measurement of configuration parameters of the code-load used during the boot sequence. The method further includes using a third set of platform configuration registers of the security coprocessor to store and extend measurements of a concurrent update that changes the code-load that was used during the boot sequence.

The computer-implemented method further including performing a local attestation using only the first set of platform configuration registers. The computer-implemented method further including performing a local attestation using only the first set of platform configuration registers and the second set of platform configuration registers.

The computer-implemented method where updating the code-load that was used during the boot sequence using the concurrent update includes loading the concurrent update into memory, and extending and storing the measurements of the concurrent update into the second set of platform configuration registers.

The computer-implemented method further including performing a remote attestation of the computing device using the first set, the second set, and the third set of platform configuration registers.

The computer-implemented method where the remote attestation includes receiving a request for the remote attestation from a verification system. In response, the method includes requesting a quote from the security coprocessor using the first set, the second set, and the third set of platform configuration registers. Further, the method includes sending the quote and an event log to the verification system. The method also includes computing, by the verification system, a hash chain based on the event log, and comparing the computed hash chain with the quote from the security coprocessor to attest authentication of the computing device.

The computer-implemented method where the remote attestation is successful based on a determination that the computed hash chain matches the quote from the security coprocessor, and the remote attestation is unsuccessful otherwise.

According to one or more embodiments of the present invention, a system includes a security coprocessor, a memory, and a processor coupled with the security coprocessor and the memory. The processor performs a method to measure concurrent updates of one or more code-loads of a computing device. The method includes using a first set of platform configuration registers of the security coprocessor to store and extend measurement of a code-load used during a boot sequence of a computing device. The method further includes using a second set of platform configuration registers of the security coprocessor to store and extend measurement of configuration parameters of the code-load used during the boot sequence. The method further includes using a third set of platform configuration registers of the security coprocessor to store and extend measurements of a concurrent update that changes the code-load that was used during the boot sequence.

In one or more examples, the local attestation is performed using only the first set of platform configuration registers. In one or more examples, the local attestation is performed using only the first set of platform configuration registers and the second set of platform configuration registers.

In one or more examples, updating the code-load that was used during the boot sequence using the concurrent update includes loading the concurrent update into memory, and extending and storing the measurements of the concurrent update into the second set of platform configuration registers.

In one or more examples, the method further includes performing a remote attestation of the computing device using the first set, the second set, and the third set of platform configuration registers. In one or more examples, the remote attestation includes receiving a request for the remote attestation from a verification system. In response, the method includes requesting a quote from the security coprocessor using the first set, the second set, and the third set of platform configuration registers. Further, the method includes sending the quote and an event log to the verification system. The method also includes computing, by the verification system, a hash chain based on the event log, and comparing the computed hash chain with the quote from the security coprocessor to attest authentication of the computing device.

In one or more examples, the remote attestation is successful based on a determination that the computed hash chain matches the quote from the security coprocessor, and the remote attestation is unsuccessful otherwise.

According to one or more embodiments of the present invention, a computer program product including a computer readable storage medium having stored thereon program instructions executable by one or more processing devices to perform a method that includes using a first set of platform configuration registers of the security coprocessor to store and extend measurement of a code-load used during a boot sequence of a computing device. The method further includes using a second set of platform configuration registers of the security coprocessor to store and extend measurement of configuration parameters of the code-load used during the boot sequence. The method further includes using a third set of platform configuration registers of the security coprocessor to store and extend measurements of a concurrent update that changes the code-load that was used during the boot sequence.

In one or more examples, the local attestation is performed using only the first set of platform configuration registers. In one or more examples, the local attestation is performed using only the first set of platform configuration registers and the second set of platform configuration registers.

In one or more examples, updating the code-load that was used during the boot sequence using the concurrent update includes loading the concurrent update into memory, and extending and storing the measurements of the concurrent update into the second set of platform configuration registers.

In one or more examples, the method further includes performing a remote attestation of the computing device using the first set, the second set, and the third set of platform configuration registers. In one or more examples, the remote attestation includes receiving a request for the remote attestation from a verification system. In response, the method includes requesting a quote from the security coprocessor using the first set, the second set, and the third set of platform configuration registers. Further, the method includes sending the quote and an event log to the verification system. The method also includes computing, by the verification system, a hash chain based on the event log, and comparing the computed hash chain with the quote from the security coprocessor to attest authentication of the computing device.

In one or more examples, the remote attestation is successful based on a determination that the computed hash chain matches the quote from the security coprocessor, and the remote attestation is unsuccessful otherwise.

According to one or more embodiments of the present invention, a computer-implemented method for measuring concurrent updates into a security coprocessor includes extending, by a processor, measurement of a code-load used during a boot sequence of a computing device into a first set of platform configuration registers of the security coprocessor. The method also includes extending, by the processor, measurement of an update for the code-load into a second set of platform configuration registers of the security coprocessor. The method also includes in response to a request for remote attestation, instructing, by the processor, generation of a quote using the first set of platform configuration registers and the second set of platform configuration registers. The method also includes in response to a request for local attestation to unseal a sealed data, instructing, by the processor, generation of decryption key(s) using the first set of platform configuration registers.

In one or more examples, the method further includes extending, by the processor, measurement of a configuration of one or more parameters of the code-load into a third set of platform configuration registers of the security coprocessor. The method may also include generating the quote for the remote attestation further using the third set of platform configuration registers.

According to one or more embodiments of the present invention, a system includes a security coprocessor, a memory, and a processor coupled with the security coprocessor and the memory. The processor performs a method to measure concurrent updates of one or more code-loads. The method includes extending, by the processor, measurement of a code-load used during a boot sequence of a computing device into a first set of platform configuration registers of the security coprocessor. The method further includes extending, by the processor, measurement of an update for the code-load into a second set of platform configuration registers of the security coprocessor. The method further includes in response to a request for remote attestation, instructing, by the processor, generation of a quote using the first set of platform configuration registers and the second set of platform configuration registers. The method further includes in response to a request for local attestation to unseal a sealed data, instructing, by the processor, generation of decryption key(s) using the first set of platform configuration registers.

In one or more examples, the method further includes extending, by the processor, measurement of a configuration of one or more parameters of the code-load into a third set of platform configuration registers of the security coprocessor, and generating the quote for the remote attestation further using the third set of platform configuration registers.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
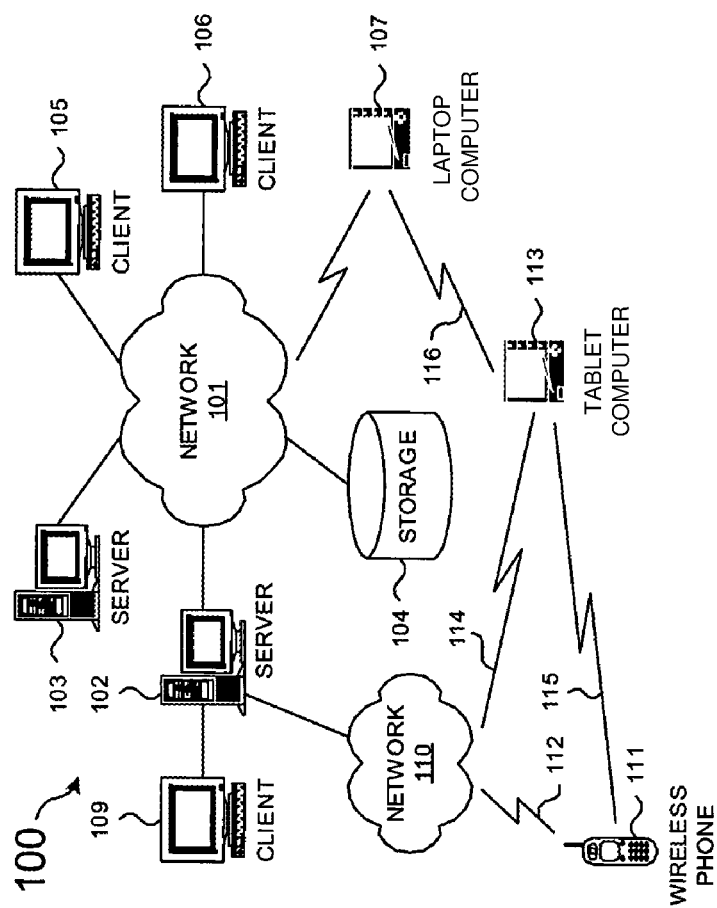
FIG. 1 depicts a typical network of computing devices, each of which may implement the present invention.

The process of booting a computing device prepares the computing device to initiate an operating system that can further facilitate execution of one or more computer program products, typically referred to as applications or programs. The initial application of power to the electronic circuitry of a computing device generally only renders the computing device capable of performing rudimentary tasks, such as fetching instructions embedded into hardware components of the computing device. The boot process executes such embedded instructions, and initiates processes that enable the computing device to perform the more complex tasks that are part of the applications, such as antivirus and malware detection applications that are generally used to keep the computing device "safe". However, because the boot process is completed prior to the execution of the operating system, malicious code executed as part of the boot process itself may not be detected, thus affecting the security of the computing device, and any data used/accessed by the computing device.

A security coprocessor, such as trusted platform module (TPM) chip, is included in the computing device to address such a technical challenge. Several embodiments of the present invention are described herein using a TPM chip as an example, however, it is understood that other types of security coprocessors can be used in other examples without deviating from the features of one or more embodiments of the present invention.

The TPM chip stores values of the computing device that uniquely identify measurements of the computing device, and that can be used to ascertain if the boot process is secure. The TPM chip includes registers to store such values in a secure manner, the storage being known as "Platform Configuration Registers" (PCRs). The stored values are accumulated once power is applied to the computing device. These measurements are indicative of the one or more instructions that are executed during the boot process and of the presence and configuration of various hardware components. The stored values in the PCRs are in a particular predetermined format if the measurements are made in the "correct" predetermined order. If the stored measurements are recognized to be identical to predetermined values, the computing device is deemed to have booted in a trusted way, and that the computing device is in a trusted state when it begins executing the operating system. Instead, if the stored measurement values fail to match a recognized format, the security of the computing device is deemed to have been compromised, and corrective action can be taken responsively.

The TPM chip further uses the measurements that are made during the boot process, and the resulting values stored in the PCRs of the TPM can be used as part of "attestation" and "sealing". "Attestation" generally refers to the providing of signed versions of one or more PCR values to an external entity so as to prove that the computing device is in a trusted state. Specifically, one or more PCR values are signed by the TPM using its private key and then transmitted to an external entity. The external entity can verify that the PCR values did indeed come from the indicated computing device, based on the fact that the PCR values were signed with the TPM's private key, and can further verify, based on the values of the PCRs themselves, that the computing device was placed into a trusted state. In some cases attestation is referred to as "remote attestation" because an external entity is used.

"Sealing", on the other hand, refers to the retention of a secret, by the TPM; that is, data that the TPM can release if the values of relevant PCRs are those specified when the secret was provided to the TPM to be "sealed." In some cases, such sealing is referred to as "local attestation".

In some cases, attestation and sealing can be performed beyond a single computing device, for example, during communications between multiple computing devices. For example, "remote attestation" can be utilized as part of a Network Access Protection (NAP) scheme, where, the computing device, seeking to join a network protected by a second computing device, provides one or more values stored in the PCRs to the second computing device. The second computing device that is protecting the network can then evaluate the computing device seeking to join the network based on the stored values. The computing device seeking to join the network has, thereby, remotely attested to its current state. A remote sealing can be similarly accomplished, with the second computing device evaluating the provided PCR values to determine whether to unseal information and provide it.

FIG. 1 depicts a typical network of computing devices, each of which may implement the present invention. As depicted, distributed data processing system 100 contains network 101, which is a medium that may be used to provide communications links between various computing devices connected together within the distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), laptop computers, tablet computers, phones, consoles etc. Distributed data processing system 100 may include additional servers, clients, routers, other devices, and peer-to-peer architectures that are not shown.

In the depicted example, the distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. In one or more examples, the distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and the computing device 113 connects to network 110 through wireless link 114. The computing devices 111 and 113 can also directly transfer data between themselves across wireless link 115 using an appropriate technology, such as Bluetooth™ wireless technology, to create so-called personal area networks (PAN) or personal ad-hoc networks. In a similar manner, the computing device 113 can transfer data to the computing device 107 via wireless communication link 116.

Figure 2:
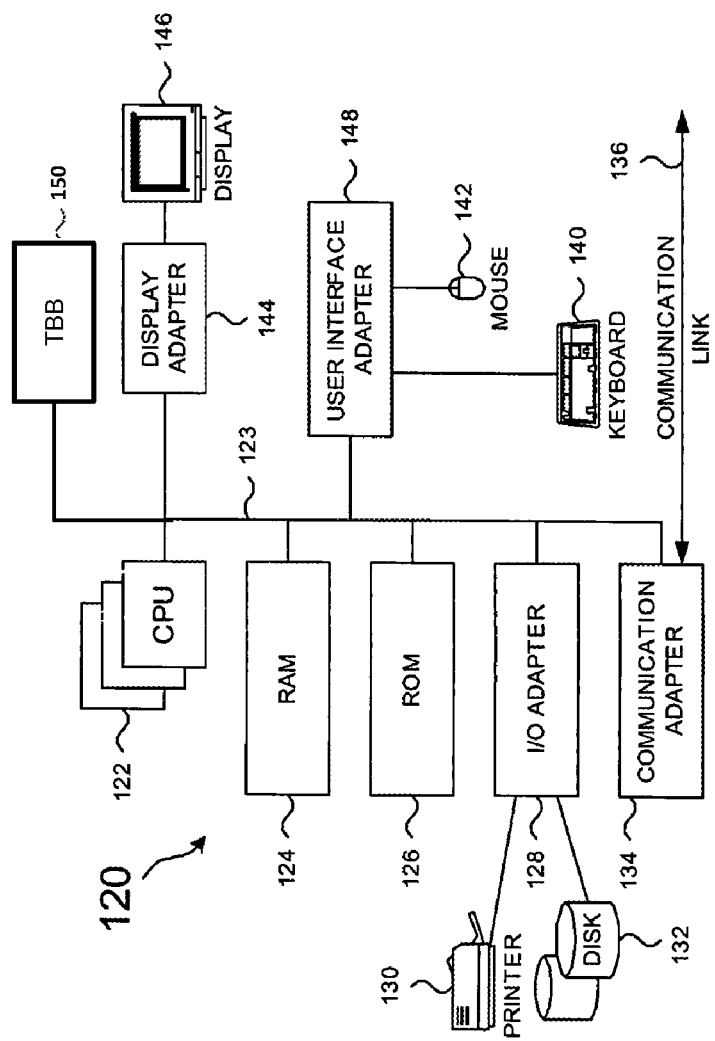
FIG. 2 depicts a typical computer architecture of a computing device.

With reference now to FIG. 2, a diagram depicts a typical computer architecture of a computing device, such as those shown in FIG. 1A, in which the present invention may be implemented. A computing device 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146. The computing device 120 can further include a trusted building block (TBB) 150.

Those of ordinary skill in the art will appreciate that the hardware in FIG. 2 may vary depending on the system implementation. Other peripheral devices may be used in addition to or in place of the hardware depicted in FIG. 2. The depicted examples are not meant to imply architectural limitations with respect to one or more embodiments of the present invention.

Figure 3:
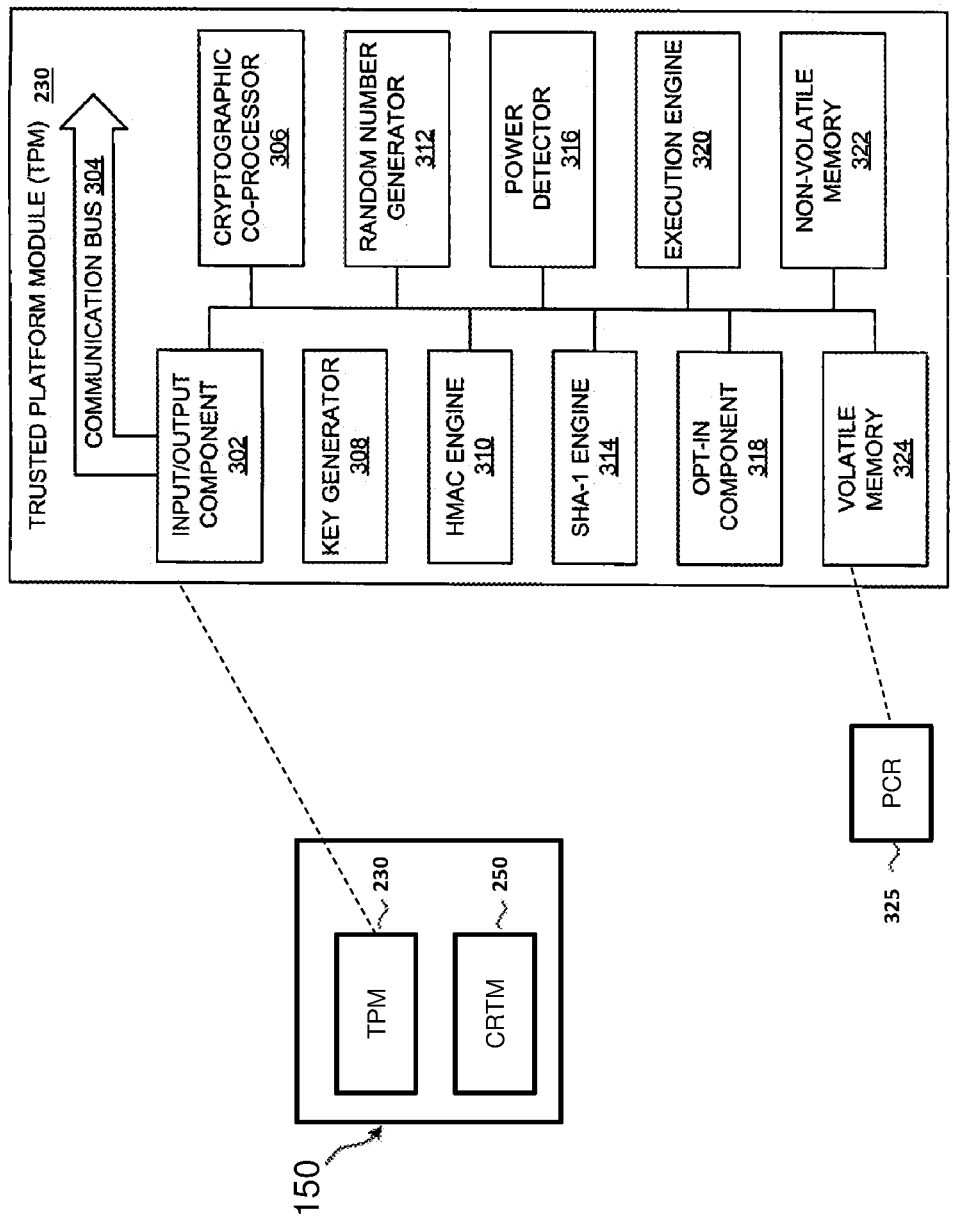
FIG. 3 depicts a block diagram of an example trusted building block according to one or more embodiments of the present invention.

FIG. 3 depicts a block diagram of an example trusted building block according to one or more embodiments of the present invention. The TBB 150 includes the combination of a core root of trust for measurement (CRTM) 230, and a trusted platform module (TPM) 232. In one or more examples, both the CRTM and the TPM 250 are connected to a motherboard (not shown) of the computing device 120.

The CRTM 230 is an immutable portion of the platform's initialization code that executes upon a reset of the computing device 120; the computing device's 120 execution must begin at the CRTM 230 upon any reset event. In this manner, the trust in the computing device 120 is based on the CRTM 230 and the behavior of the TPM 250, and the trust in all measurements is based on the integrity of the CRTM 230.

The TPM 250 includes at least the components depicted in FIG. 2 according to trusted computing group (TCG) specifications. Trusted platform module 250 includes input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA (named for its inventors Rivest, Shamir, and Adelman) asymmetric cryptographic key pairs. HMAC engine 310 performs HMAC (Keyed-Hashing for Message Authentication) calculations, whereby message authentication codes are computed using secret keys as integrity checks to validate information transmitted between two parties, according to one or more known techniques.

Random number generator 312 acts as a source of randomness for the computation of various values, such as nonces, keys, or other values. SHA-1 engine 314 implements the SHA-1 hash algorithm. It should be noted that in one or more examples, the TPM 250 can include an engine that implements an alternative algorithm to the SHA-1, or algorithms in addition to the SHA-1. Power detector 316 manages the power states of the TPM 250 in association with the power states of the platform. Opt-in component 318 maintains the state of persistent and volatile flags and enforces semantics associated with those flags such that the trusted platform module may be enabled and disabled. Execution engine 320 runs program code to execute commands that the TPM 250 receives through input/output component 302. Non-volatile memory 322 stores persistent identity and state associated with the TPM 250; the non-volatile memory may store static data items but is also available for storing dynamic data items by entities that are authorized by the TPM 250 owner, whereas volatile memory 324 stores dynamic data items.

The volatile memory 324 includes one or more Platform Configuration Registers (PCRs) 325. The TPM 250 can extend one or more PCRs 325 with the hash value in an analogous manner to its traditional operation where one or more PCRs 325 are extended with hash values that represent measured components that were initialized or executed on the computing device 120. The hash of the message can also be included in a log of components that were initialized or executed on the computing device 120, thereby enabling the log to maintain parity with the relevant PCR values.

In the TCG model, the pre-OS PCRs 325 record the software history in a repeatable way. The history can include Basic Input/Output System (BIOS) or Unified Extensible Firmware Interface (UEFI) platform firmware, option ROMs, the disk boot block, early OS software, and the like. This history is sometimes referred to as a TCG log and is shared with a verification system that wants to attest the computing device.

Typically, predetermined PCRs, such as PCR 0-7 are all used to record the software state. This state is recorded once as the computing device 120 boots, and never changes after the boot process is complete. The PCR values are repeatable because pre-OS software rarely changes, and because the boot process is single threaded. Because the record is repeatable, the PCRs 325 can authorize the use of TPM objects during local attestation (sealing). In a typical design, a secret such as a disk OS encryption key is locked to known good PCR values. The secret is released only if the pre-OS software is correct. In addition, the PCRs 325 can be used for remote attestation. Here, the TPM 250 signs a digest of the requested PCRs 325. An external validation system can validate the signature and PCRs 325 to determine whether the computing device 120 is running approved software.

The existing operations using the TPM 250 do not handle a computing device 120 that does a concurrent update, where firmware of the computing device 120 is updated without rebooting. If the update also changes the PCRs 325 (for example, to permit a valid remote attestation), local attestation fails because the authorization is tied to the original values of the PCRs 325 at boot. If the update does not change the PCRs 325 (to permit local attestation), then the remote attestation cannot report the update.

Further, for a useful remote attestation, any (concurrent) update has to be measured into the PCRs 325. For a manageable use of local attestation (aka sealing), it is not feasible to measure any concurrent updates into the same PCRs 325 used for measuring the boot sequence, because for successful unsealing every possible and valid PCR value has to be predicted and authorized. Additionally, if the concurrent updates that are being performed for the firmware of the computing device 120 allows going back and forth between different versions of the firmware without reset of PCRs 325, it results in a possibly infinite number of permutations of PCR values that are valid for unsealing.

One or more embodiments of the present invention described herein address such technical challenges of concurrent updates to the firmware of the computing device 120 that facilitates remote attestation and local attestation at the same time. According to one or more embodiments of the present invention, local attestation (sealing) is split from remote attestation by measuring the initial code load into one set of PCRs 325 and any subsequent concurrent updates into a different set of PCRs 325. According to one or more embodiments of the present invention, to prevent having an infinite number of valid PCR values in an environment where remote and local attestation is used at the same time, measurements of the initial boot process and measurements for any subsequent concurrent updates are stored separately.

For example, local attestation (Unsealing) can be based on the PCRs 325 used for the measurement of initial boot (e.g. PCR 0, 2, 4), while remote attestation can be based on the values of all PCRs 325 (e.g. PCR 0, 1, 2, 3, 4, 5, 6, . . . ).

There are several important characteristics of PCRs 325. First, the PCR 325 may only be changed by an "extend" operation. The extend operation uses a secure hash of the prior value and the new "extend" value to create the new PCR content. Second, the PCR 325 is order sensitive, e.g., "(extend(a, extend(b,0)) !=extend(b, extend(a,0))," and the PCR remembers historical information. Third, any program/application that runs on the computing device 120 is measured and extended into a PCR 325 before the program/application is run in the trust chain that was previously measured before the application is run. Conventionally, the trust chain starts with special code, called the RTM (or Root of Trust for Measurement) that is tied to the System Reset signal. Finally, the PCRs 325 use cryptographic hashing techniques to ensure the PCRs 325 are safe and trustworthy.

Figure 4:
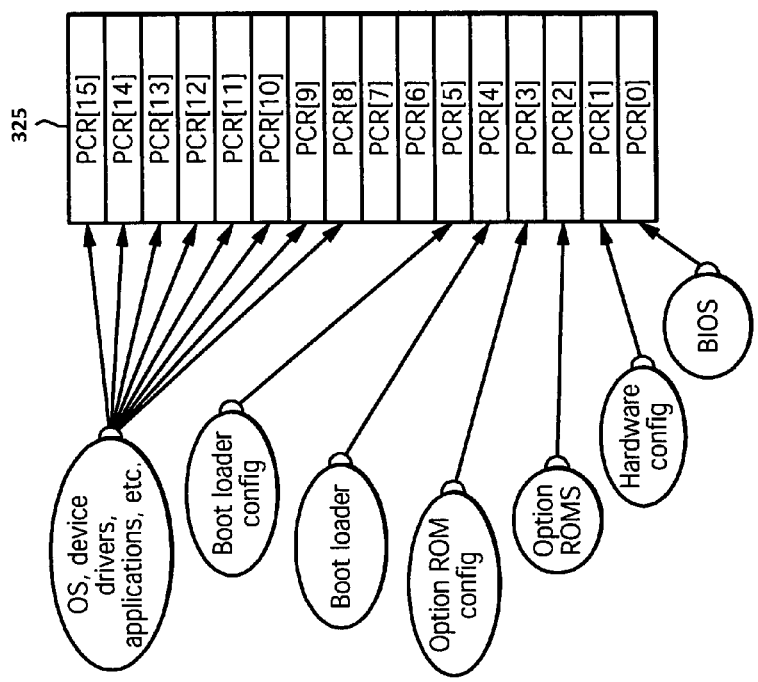
FIG. 4 illustrates conventional usage of platform configuration registers (PCRs) according to current TCG specifications according to one or more embodiments of the present invention.

FIG. 4 illustrates conventional usage of PCRs 325 according to current TCG specifications. As shown, 16 PCRs (PCR0-PCR15) 325 are provided within the TPM 250, each assigned to specific software/firmware functions of the computing device 120. PCR0 through PCR5, inclusive, have specific definitions for their respective contents. As shown, for example, PCR0 is allocated to BIOS, PCR1 to hardware configuration, and PCR5 to boot loader configuration. It is understood that in other embodiments of the present invention, the number of PCRs 325 can be different, and the allocation of the PCRs 325 to one or more specific function can be different.

Other PCRs are allocated to similar purposes although their precise contents are not always specified. Specifically, PCR8-PCR15, inclusive, are allocated to unspecified uses in the Operating System (OS). Using LINUX as an example of a modern operating system, there are many components (typically around 500) that must be recorded into the eight PCRs assigned to the OS (i.e., PCR8-15). Example components include kernel, kernel extensions, device drivers, kernel configuration information, device driver configuration information, shared libraries, system services (daemons), executables (binary), and executables such as Java byte streams, shell scripts, and Perl programs, for example.

In this example scenario, the special operation of "sealing" protects cryptographic key materials (or any other data) by tying the information to the specific contents of a specific set of PCR values. As described herein, "sealing" refers to performing an encryption with system configuration information in addition to the usual cryptographic key. When information is "sealed to a set of PCRs", the information is not merely encrypted but is further protected against any system configuration change. Hence, the technical challenge that if the system configuration changes (as represented by a change in the PCR values because of an update), the data cannot be unsealed (decrypted). For example, a changed configuration can be a sign of an attempt to hijack the system, such as a "root kit attack" or a virus, and the PCR 325 and log-file changes induced by the change prevents data from being unsealed and exposed to the attacking agent. Sealing also binds the decryption operation to the specific machine, in this case the computing device 120. If a user copies the sealed data to another machine, the data cannot be unsealed even if the hardware and software configurations are identical.

Figure 5:
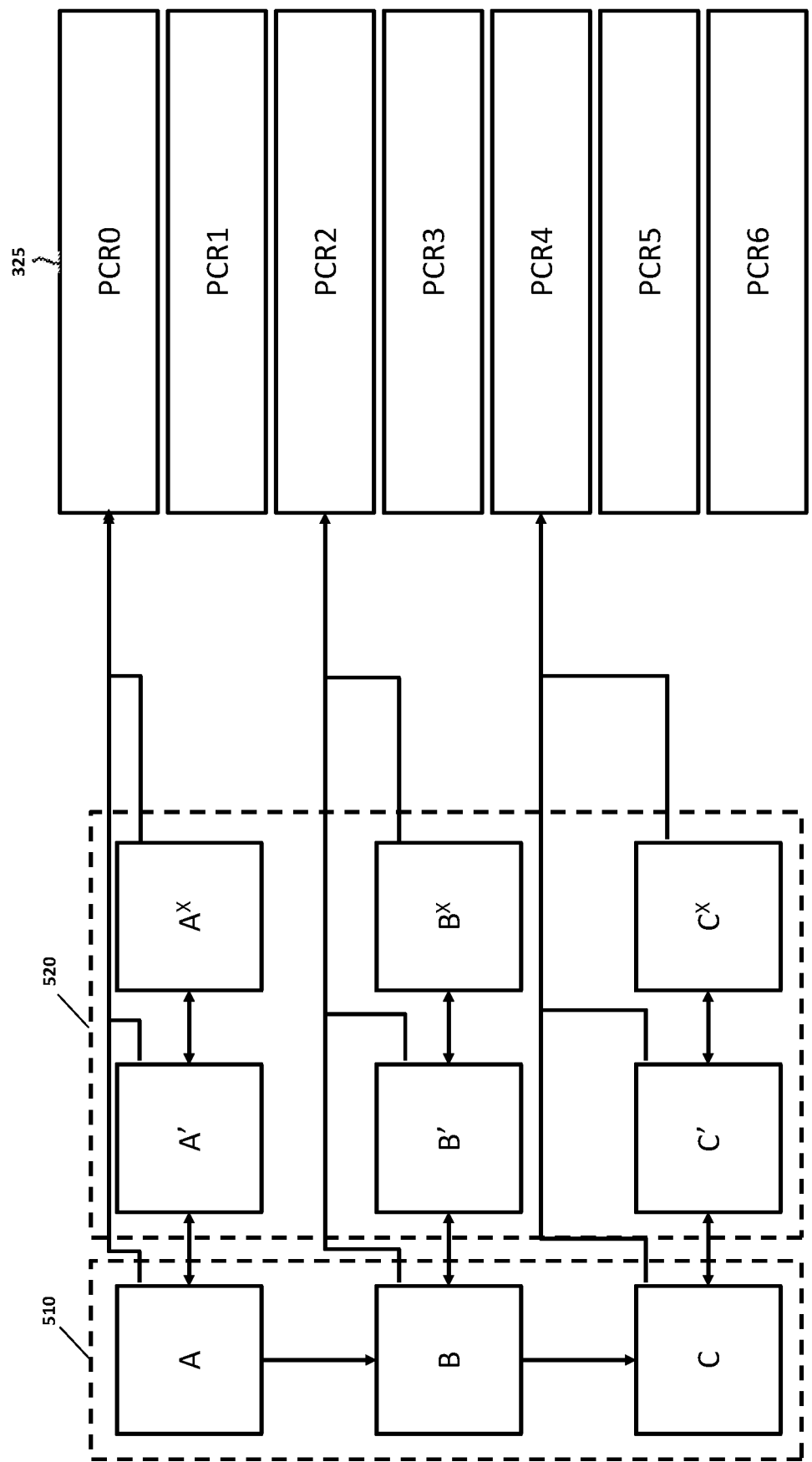
FIG. 5 depicts an extending PCRs according to existing techniques.

FIG. 5 depicts extending PCRs according to existing techniques. Here, one or more modules, such as BIOS, OS modules, OS kernels, drivers, etc. are depicted as module 510. Concurrent updates of such modules are depicted as updated modules 520. For example, a first module 510, module-A is updated to module-A', further updated to module-Ax. Similarly, other modules, B, C, or any other can be concurrently updated. In the existing techniques, an update triggers extending of the PCR 325 that stores the initial PCR values for a module 510. For example, consider that the first module-A 510 has corresponding PCR values stored in the PCR0 325; in such a case, when the first module-A 510 is updated, say to module-A', the PCR0 325 is extended to represent PCR values corresponding to the updated module-A' 520. The PCR0, after extension is based on the earlier value of PCR0 (prior to update) and a new hash value based on the updated module-A' 520.

Figure 6:
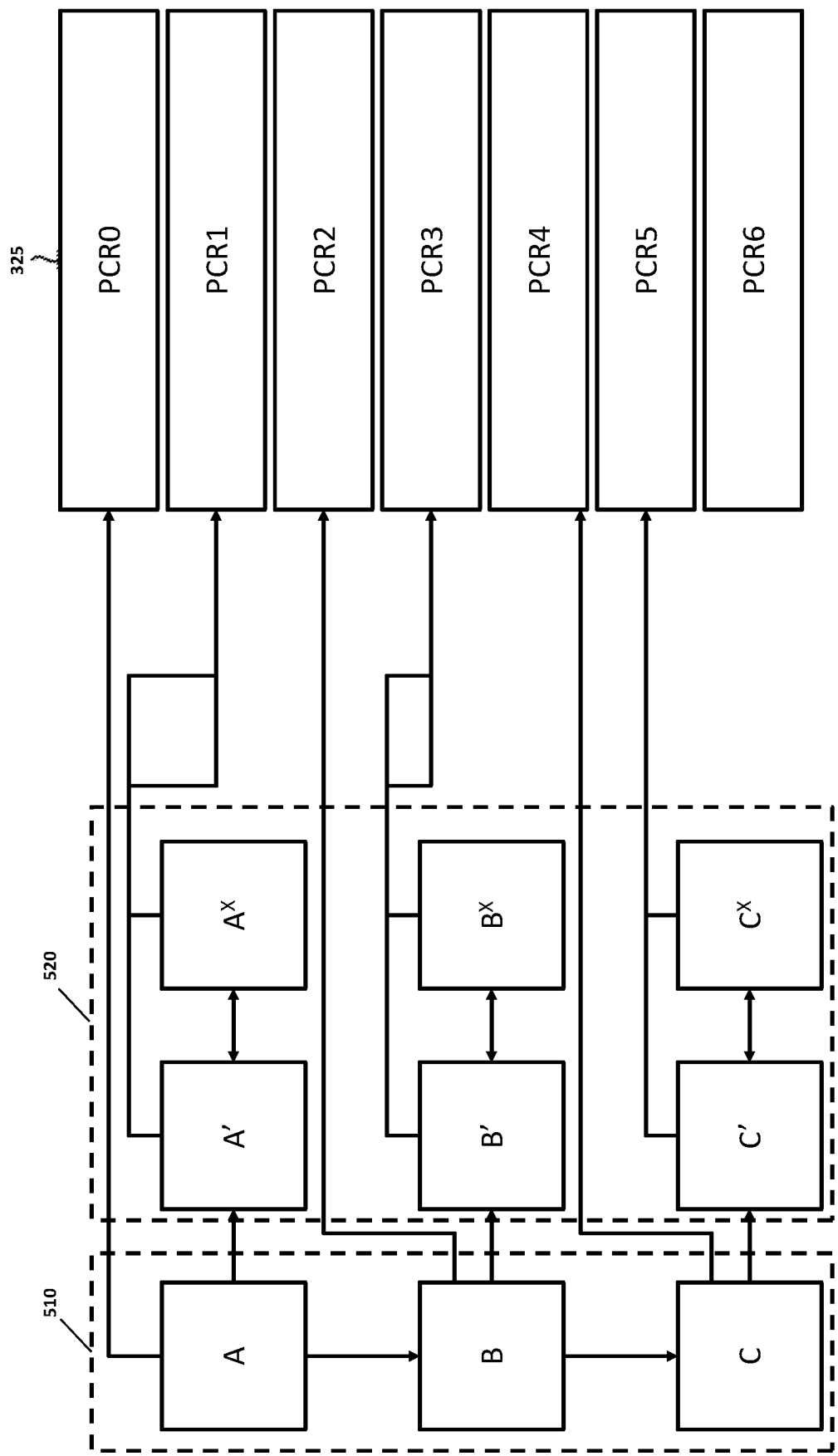
FIG. 6 depicts extending PCRs according to one or more embodiments of the present invention.

FIG. 6 depicts extending PCRs according to one or more embodiments of the present invention. Here, the initial execution of the modules 510 cause extending a first set of the PCRs 325. For example, the first module-A 510 causes extending the PCR0 325. The updates of the modules 510 cause extending of a second set of PCRs 325. For example, the updated module-A' 520 causes extending the PCR1 325, and the PCR0 325 is not changed. Similarly, any further updates to the modules 510 do not change the PCR values in the first set of PCRs 325 (e.g. PCR0, PCR2, PCR4, and so on). Rather, the updates cause extending of the second set of PCRs 325 (e.g. PCR1, PCR3, PCR5, and so on).

Figure 7:
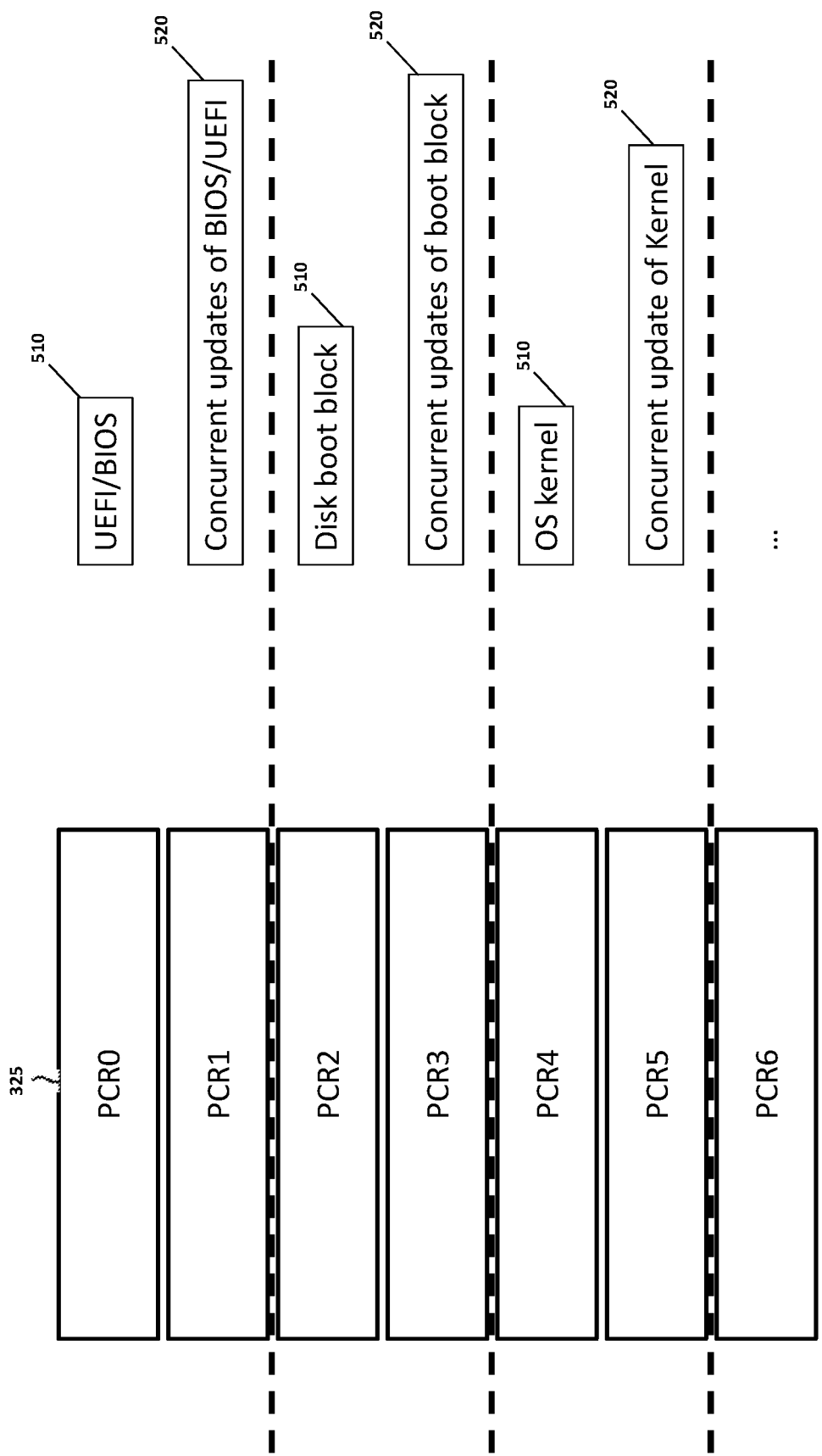
FIG. 7 depicts a specific example of extending PCRs separately for modules and concurrent updates of the modules according to one or more embodiments of the present invention.

FIG. 7 depicts a specific example of extending PCRs separately for modules and concurrent updates of the modules according to one or more embodiments of the present invention. Here, the BIOS is extended into the PCR0 325. When the BIOS is updated, the updated BIOS is extended into PCR1 325, and the values in PCR0 are maintained as is. In a similar manner, disk boot block and OS kernel are extended into PCR2 and PCR4 respectively, and updated disk boot block ad updated OS kernel are extended into PCR3 and PCR5, with the PCR2 and PCR4 values maintained.

Figure 8:
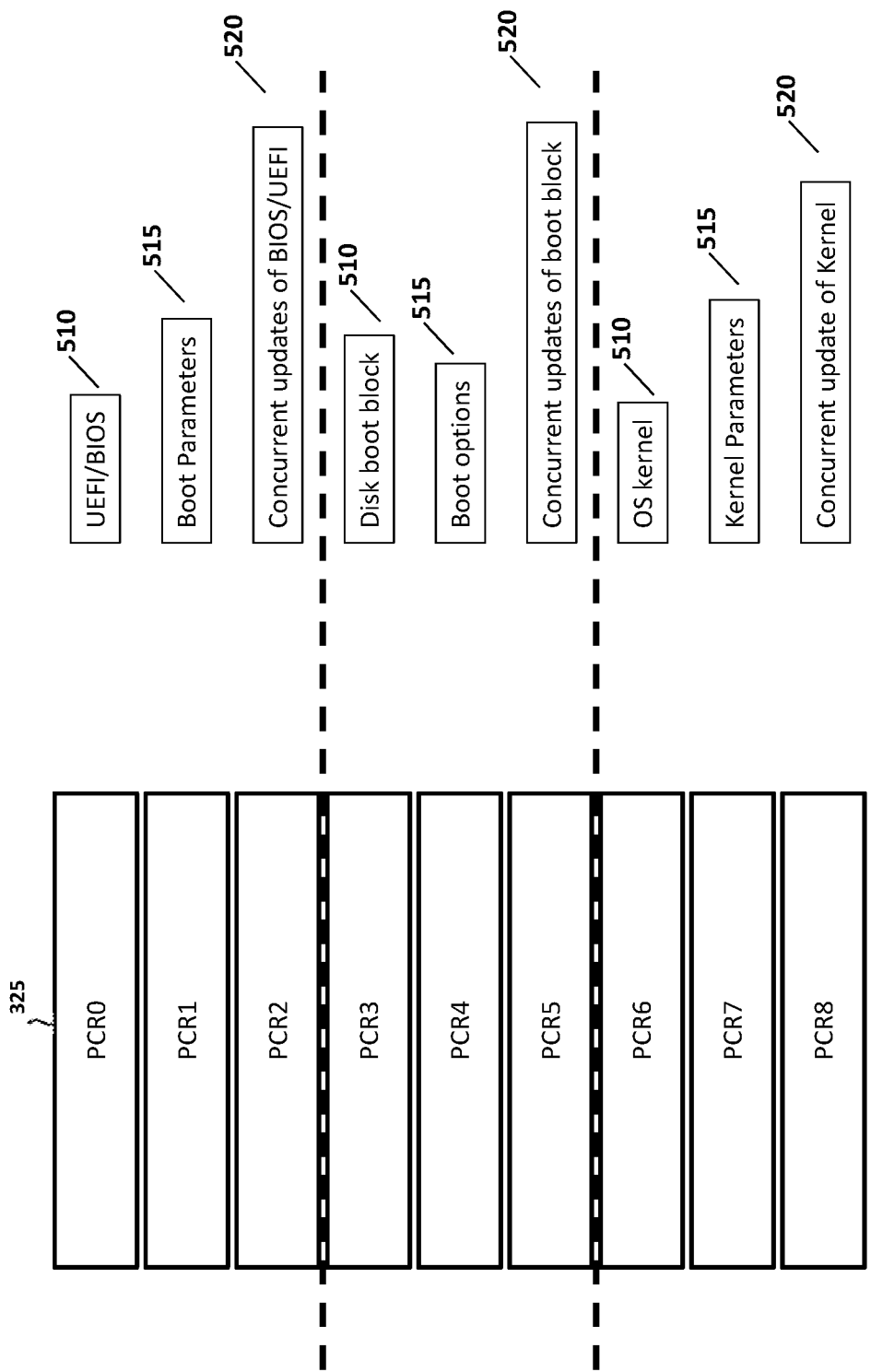
FIG. 8 depicts further examples of extending PCRs separately for modules, concurrent updates, and module parameters according to one or more embodiments of the present invention.

FIG. 8 depicts further examples of extending PCRs separately for modules, concurrent updates, and module parameters according to one or more embodiments of the present invention. Here, the BIOS is extended into the PCR0 325. Any one or more parameters 515 that are used during the execution of the BIOS are extended into a separate PCR 325, say PCR1. When the BIOS is updated, the updated BIOS is extended into PCR2 325, and the values in PCR0 are maintained as is. Here, the parameters in PCR1, which are corresponding to the parameters 515, are also maintained as is. In a similar manner, disk boot block and OS kernel are extended into PCR3 and PCR6 respectively, and updated disk boot block ad updated OS kernel are extended into PCR5 and PCR5, with the PCR3 and PCR6 values maintained. The parameters 515 that provide configuration or options used during the execution of each of these modules 510 are extended into separate PCRs 325. For example, the parameters 515 for the disk boot block are extended into PCR4, the parameters 515 for the OS kernel are extended into PCR7, and these PCR values are maintained as is if and when the modules 510 are updated.

It should be noted that the particular PCRs used for particular modules in the above examples can vary from implementation to implementation.

Figure 9:
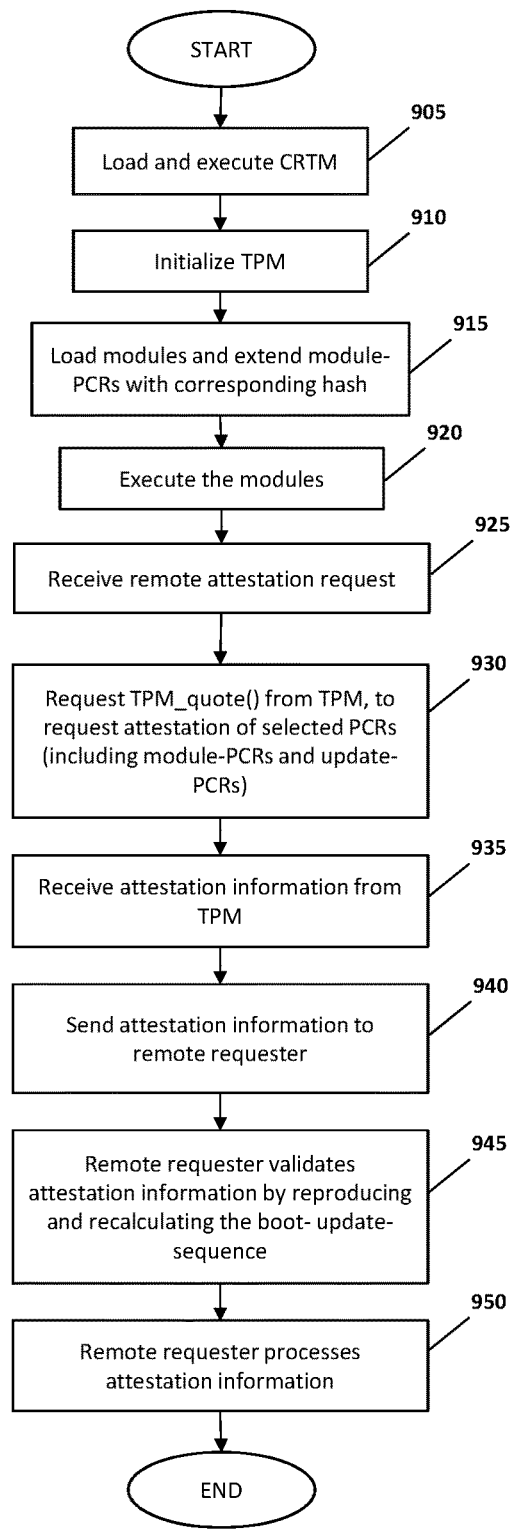
FIG. 9 depicts a flowchart of remote attestation according to one or more embodiments of the present invention.

FIG. 9 depicts a flowchart of remote attestation according to one or more embodiments of the present invention. The method includes booting the computing device 120. The booting includes loading and executing the CRTM 230 (905). Further, the TPM 250 is initialized (910). In one or more examples, initializing the TPM 250 includes setting the PCRs 325 to a preset value, such as 0.

Further, the method includes loading one or more modules 510 and extending corresponding module-PCRs 325 with hash values based on the loaded modules 510 (915). The modules 510 can include pre-OS boot modules, disk boot block, OS kernel, device drivers, and such modules 510. Extending the PCRs 325 for a module 510 includes measuring a state of the computing device 120 upon loading the module 510 and requesting the TPM 250 to extend the corresponding PCRs 325 using a hash of the measured state. For example, consider current value of a PCR is X, (Say, 0x0000 . . . 0000), and it is to be extended with data Y representing measurement of a state of the computing device 120. In one or more examples, Y is a 20-byte value to be used by SHA-1 algorithm. Extending the PCR includes the TPM 250 calculating hash (Y, X)=Z; and changing value in PCR to Z. Further extending the PCR is performed in a similar manner by using the existing value of the PCR to compute an updated value using hashing.

In one or more examples, extending the module-PCRs 325 includes extending two separate sets of PCRs 325—a first set of PCRs 325 for the modules 510 and a second set of PCRs 325 for the parameters 515 of the modules 510 being loaded.

The modules 510 that are loaded are then executed (920). Here, loading refers to loading a module and its corresponding parameters into memory, such as RAM, and executing includes executing one or more instructions of the modules 510.

The method further includes receiving remote attestation request (925). The remote attestation request can be received from an external computing device, such as a server, peer or the like. In one or more examples, the remote attestation request can be received from a virtual machine, which may be executing on the same computing device 120 itself, or on a separate computing device 120.

In response to the received request, the computing device 120 requests a quote from the TPM 50 (930). For example, a TPM_Quote( ) function is executed using an API of the TPM 250. The TPM quote request is for attestation of selected PCRs 325 for the modules 510. In one or more examples, the selected PCRs 325 to generate the TPM quote include the module-PCRs and another set of PCRs 325-update-PCRs. In one or more examples, the update-PCRs can be a third set of PCRs 325, the first being the module-PCRs, and the second being the parameter-PCRs. The update-PCRs 325 are the PCRs 325 which are extended when the modules 510 are updated. In one or more examples, the update-PCRs 325 can include the base value (e.g. 0) if the one or more of the modules 510 have not been updated.

The CPU 122 sends a selection of the PCRs 325 for which to generate the TPM quote. For example, the selection includes the module-PCRs 325 and the update-PCRs. In addition, in one or more examples, the selection can include the parameter-PCRs if they are maintained separately from the module-PCRs. Alternatively, or in addition, the selection of PCRs 325 is provided by the verifier system that sends the remote attestation request. In one or more examples, the remote attestation request can include a nonce provided by the verifier system.

The method further includes receiving the attestation information from the TPM 250 (935). The attestation information includes signed report of current PCR values of the selected PCRs that are requested. The method further includes sending the attestation information to the remote requester i.e. verifier system (940). The remote requester validates attestation information by reproducing and recalculating the boot-sequence and the update-sequence (945). In one or more examples, the remote requester reproduces and recalculates the sequences based on a TCG log that the computing device 120 sends to the remote requester as part of the attestation information. The remote requester, by reproducing and recalculating the hash values according to the TCG log, can compute the same values as the PCR values.

Further, the remote requester validates the attestation information received from the TPM 250 (950). If the PCR values from the attestation information from the TPM 250 match the PCR values computed by the remote requester, the attestation is deemed successful, else the attestation fails.

Figure 10:
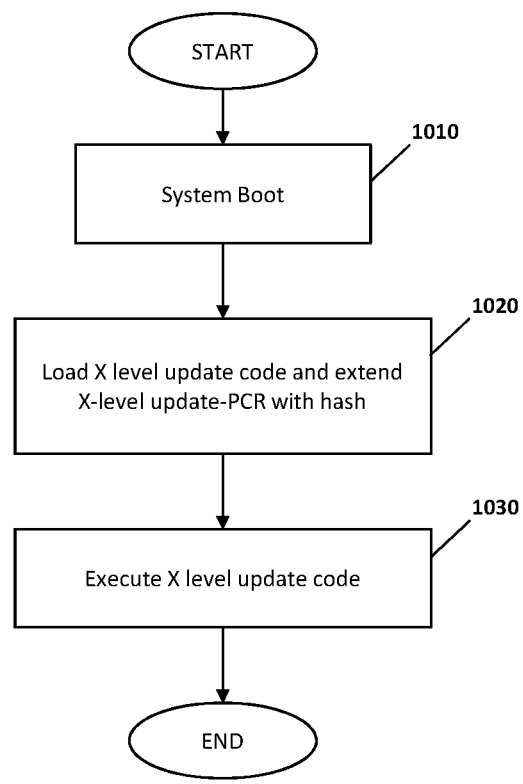
FIG. 10 depicts a concurrent update of the one or more modules of the computing device according to one or more embodiments of the present invention.

FIG. 10 depicts a concurrent update of the one or more modules of the computing device according to one or more embodiments of the present invention. Here, the method includes completing the system boot operations, at 1010. The operations include those described earlier (see FIG. 9) where the modules 510 are loaded and corresponding module-PCRs (and parameter-PCRs) 325 are extended. The modules 510 are also executed to complete the booting process. In one or more examples, additional pre-OS modules 510 can also be loaded and executed as part of the system boot.

Further, if a first module-A 510 is to be updated to, say, level X (i.e. module-Ax 520), the level-X update code is loaded into the memory (e.g. RAM) form the disk 132 (1020). Further, update-PCRs are extended with hash for a measurement of the computing device 120 when the update code for the module is loaded (1030). Subsequently, the update code is executed to update the module-A 510 to module-Ax 520. In one or more examples, the update can include changing the level X from a lower level to a higher level, such as from version 1 to version 2. Alternatively, the "update" can include reverting the level of the module-A from a higher level to a lower level, for example, from version 2 to version 1.

Figure 11:
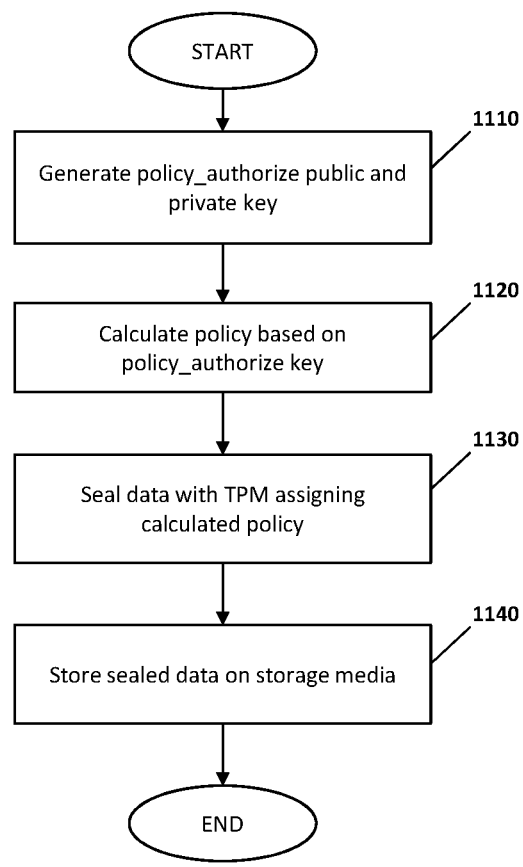
FIG. 11 depicts a flowchart for sealing information using the trusted platform module (TPM) according to one or more embodiments of the present invention.

FIG. 11 depicts a flowchart for sealing information using the TPM according to one or more embodiments of the present invention. The method is performed similar to existing techniques, the method including generating public and private keys according to a policy being used (1110) and the module-PCRs 325. The module-PCRs 325, as described herein, include the PCR values corresponding to loading the modules 510, particularly pre-OS modules into the memory. In one or more examples, the parameter-PCRs 325 that are extended based on the one or more parameters used for loading the modules 510 are also used for generating the key(s).

The method further includes calculating a policy based on the keys (1120). Further, the data that is to be sealed is encrypted with the TPM 250 assigning the calculated policy (1130). The sealed data is then stored to the disk 132 or any other storage media (1140). Accordingly, performing the sealing is not affected by the updated modules.

Figure 12:
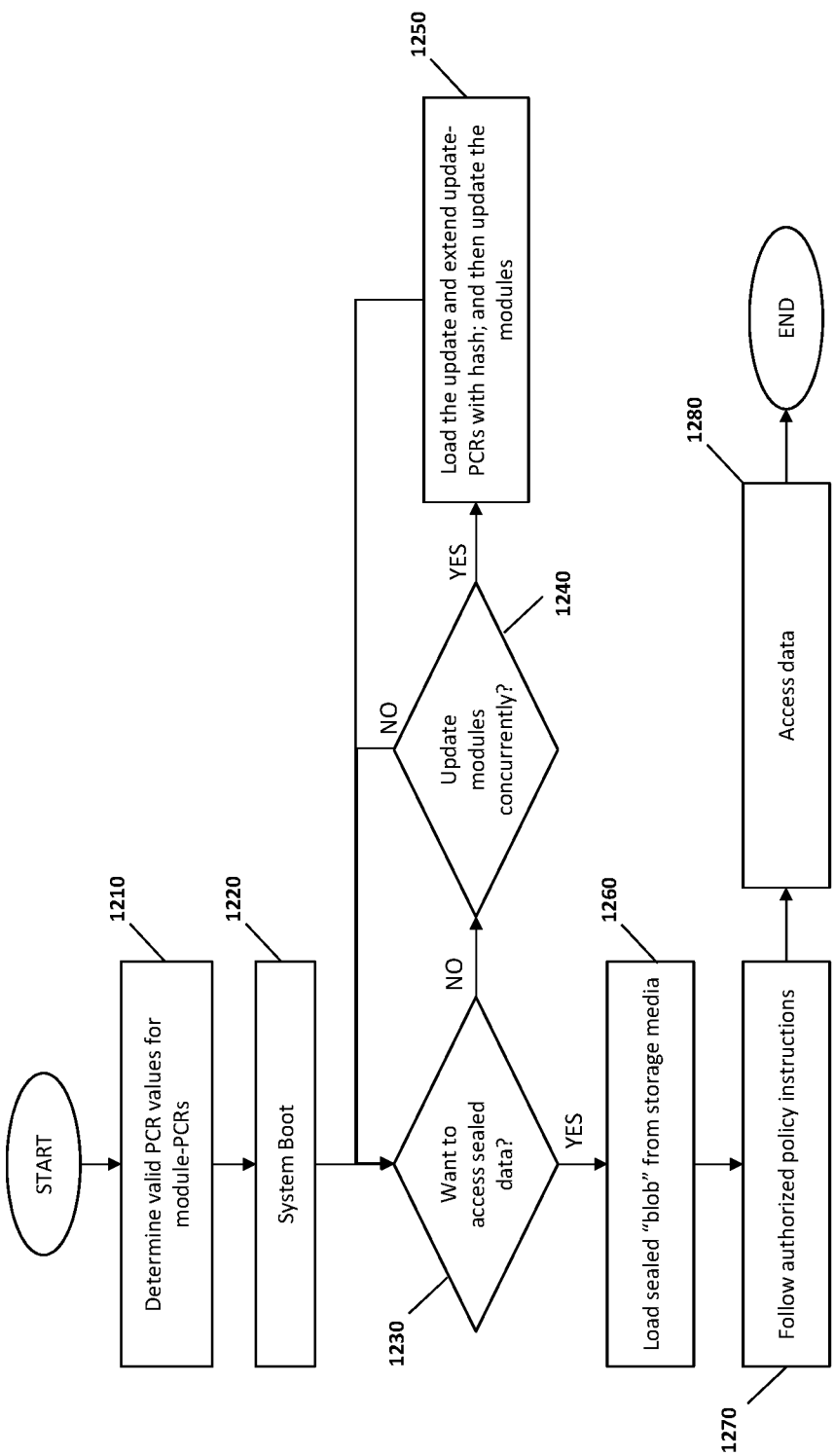
FIG. 12 depicts a flowchart for unsealing information using the TPM according to one or more embodiments of the present invention.

FIG. 12 depicts a flowchart for unsealing information using the TPM according to one or more embodiments of the present invention. As in existing techniques, valid PCR values are determined, where the valid PCR values represent that the pre-OS modules 510 are loaded and executed in a valid manner (1210). The computing device 120 is booted as described herein by loading and executing the pre-OS modules 510 (1220). The module-PCRs are extended during the booting and in one or more examples, the module-PCRs 325 are compared with the predetermined valid values to ensure authentication and validity of the executed modules 510. If a request to access a sealed data is received, the sealed "blob" of data is obtained from corresponding storage media 132 and policy instructions are followed to unseal the data using the module-PCR values (1230, 1260, and 1270). As per TCG and TPM specifications, according to the authorization policy setup on the computing device 120, the data is unsealed using the module-PCR values and the data can be accessed (1280).

If a data access request is not received, and if a concurrent update is to be performed for one or more of the modules 510, the update is loaded in memory and the corresponding update-PCRs are extended (not the module-PCRs) (1230, 1240, 125). Further, the module 510 is updated to the module 520 (1250) by executing the update. The update can be performed without rebooting the computing device 120, i.e. concurrent update. Accordingly, if the request to access the sealed data is received after the concurrent update, the module-PCRs can be continued to be used to unseal the sealed data as described above.

Accordingly, the technical challenge of a concurrent update preventing unsealing of sealed data is addressed by one or more embodiments of the present invention.

Described herein are one or more embodiments of the present invention that facilitates measuring concurrent updates to one or more software modules in a computing device that is equipped with a TPM chip, and particularly concurrent updates to modules that are measured into the PCRs. According to an example method, measuring the concurrent update includes using a first set of PCRs to store and extend measurement of the boot sequence, using a second set of PCRs to store and extend measurements of the configuration of the boot sequence, and using a third set of PCRs to store and extend measurements of concurrent updates of different code layers. PCRs extended in this manner can be used for local attestation (sealing) based on the first set of PCR values. In one or more examples, the local attestation is performed based on the first set and the second set of PCR values. Further yet, remote attestation is performed using all three sets of PCRs that are extended in this manner.

One or more embodiments of the present invention facilitate concurrent updates to be performed in computing devices that use TPM for security and authentication purposes. Alternatively, or in addition, one or more embodiments of the present invention facilitate such security and authentication to be used in computing devices that are designed to not be booted (or booted very infrequently) such as computer servers that are required to have a very minimal down time, if at all. One or more embodiments of the present invention accordingly improve computing technology itself, particularly computing devices by facilitating concurrent updates of one or more modules that are used by the TPM for data security and authentication.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for measuring concurrent updates in a security coprocessor, the method comprising:
    using a first set of platform configuration registers of the security coprocessor to store and extend measurement of a code-load used during a boot sequence of a computing device;
    using a second set of platform configuration registers of the security coprocessor to store and extend measurement of configuration parameters of the code-load used during the boot sequence; and
    using a third set of platform configuration registers of the security coprocessor to store and extend measurements of a concurrent update that changes the code-load that was used during the boot sequence.

2. The computer-implemented method of claim 1, further comprising performing a local attestation using only the first set of platform configuration registers.

3. The computer-implemented method of claim 1, further comprising performing a local attestation using only the first set of platform configuration registers and the second set of platform configuration registers.

4. The computer-implemented method of claim 1, wherein updating the code-load used during the boot sequence using the concurrent update comprises:
    loading the concurrent update into memory; and
    extending and storing the measurements of the concurrent update into the second set of platform configuration registers.

5. The computer-implemented method of claim 1, further comprising performing a remote attestation of the computing device using the first set, the second set, and the third set of platform configuration registers.

6. The computer-implemented method of claim 5, wherein the remote attestation comprises:
    receiving a request for the remote attestation from a verification system;
    in response to receiving a request for the remote attestation:
        requesting a quote from the security coprocessor using the first set, the second set, and the third set of platform configuration registers;
        sending the quote and an event log to the verification system;
        computing, by the verification system, a hash chain based on the event log; and
        comparing the computed hash chain with the quote from the security coprocessor to attest authentication of the computing device.

7. The computer-implemented method of claim 6, wherein the remote attestation is successful based on a determination that the computed hash chain matches the quote from the security coprocessor, and the remote attestation is unsuccessful otherwise.

8. A system comprising:
a security coprocessor;
a memory; and
a processor coupled with the security coprocessor and the memory, the processor configured to perform a method to measure concurrent updates of one or more code-loads of a computing device, the method comprising:
using a first set of platform configuration registers of the security coprocessor to store and extend measurement of a code-load used during a boot sequence of the computing device;
using a second set of platform configuration registers of the security coprocessor to store and extend measurement of configuration parameters of the code-load used during the boot sequence; and
using a third set of platform configuration registers of the security coprocessor to store and extend measurements of a concurrent update for the code-load that was used during the boot sequence.

9. The system of claim 8, further comprising performing a local attestation using only the first set of platform configuration registers.

10. The system of claim 8, further comprising performing a local attestation using only the first set of platform configuration registers and the second set of platform configuration registers.

11. The system of claim 8, wherein updating the code-load used during the boot sequence using the concurrent update comprises:
loading the concurrent update into memory; and
extending and storing the measurements of the concurrent update into the second set of platform configuration registers.

12. The system of claim 8, further comprising performing a remote attestation of the computing device using the first set, the second set, and the third set of platform configuration registers.

13. The system of claim 12, wherein the remote attestation comprises:
receiving a request for the remote attestation from a verification system;
in response to receiving a request for the remote attestation:
requesting a quote from the security coprocessor using the first set, the second set, and the third set of platform configuration registers;
sending the quote and an event log to the verification system;
computing, by the verification system, a hash chain based on the event log; and
comparing the hash chain with the quote from the security coprocessor to attest authentication of the computing device.

14. The system of claim 13, wherein the remote attestation is successful based on determination that the hash chain matches the quote from the security coprocessor, and the remote attestation is unsuccessful otherwise.

15. A computer program product comprising a computer readable storage medium having stored thereon program instructions executable by one or more processing devices to perform a method of comprising:
using a first set of platform configuration registers of a security coprocessor to store and extend measurement of a code-load used during a boot sequence of a computing device;
using a second set of platform configuration registers of the security coprocessor to store and extend measurement of configuration parameters of the code-load that is used during the boot sequence; and
using a third set of platform configuration registers of the security coprocessor to store and extend measurements of a concurrent update for the code-load that is used during the boot sequence.

16. The computer program product of claim 15, further comprising performing a local attestation using only the first set of platform configuration registers.

17. The computer program product of claim 15, further comprising performing a local attestation using only the first set of platform configuration registers and the second set of platform configuration registers.

18. The computer program product of claim 15, wherein updating the code-load used during the boot sequence using the concurrent update comprises:
loading the concurrent update into memory; and
extending and storing the measurements of the concurrent update into the second set of platform configuration registers.

19. The computer program product of claim 15, further comprising performing a remote attestation of the computing device using the first set, the second set, and the third set of platform configuration registers.

20. The computer program product of claim 19, wherein the remote attestation comprises:
receiving a request for the remote attestation from a verification system;
in response:
requesting a quote from the security coprocessor using the first set, the second set, and the third set of platform configuration registers;
sending the quote and an event log to the verification system;
computing, by the verification system, a hash chain based on the event log; and
comparing the hash chain with the quote from the security coprocessor to attest authentication of the computing device.

21. The computer program product of claim 20, wherein the remote attestation is successful based on determination that the hash chain matches the quote from the security coprocessor, and the remote attestation is unsuccessful otherwise.

22. A computer-implemented method for measuring concurrent updates into a security coprocessor, the method comprising:
extending, by a processor, measurement of a code-load used during a boot sequence of a computing device into a first set of platform configuration registers of the security coprocessor;
extending, by the processor, measurement of an update for the code-load into a second set of platform configuration registers of the security coprocessor;
in response to a request for remote attestation, instructing, by the processor, generation of a quote using the first set of platform configuration registers and the second set of platform configuration registers; and in response to a request for local attestation to unseal a sealed data, instructing, by the processor, generation of decryption key(s) using the first set of platform configuration registers.

23. The computer-implemented method of claim 22, further comprising:

extending, by the processor, measurement of a configuration of one or more parameters of the code-load into a third set of platform configuration registers of the security coprocessor; and generating the quote for the remote attestation further using the third set of platform configuration registers.

24. A system comprising:

security coprocessor;

a memory; and a processor coupled with the security coprocessor and the memory, the processor configured to perform a method to measure concurrent updates of one or more code-loads, the method comprising:

extending, by the processor, measurement of a code-load used during a boot sequence of a computing device into a first set of platform configuration registers of the security coprocessor;

extending, by the processor, measurement of an update for the code-load into a second set of platform configuration registers of the security coprocessor;

in response to a request for remote attestation, instructing, by the processor, generation of a quote using the first set of platform configuration registers and the second set of platform configuration registers; and in response to a request for local attestation to unseal a sealed data, instructing, by the processor, generation of decryption key(s) using the first set of platform configuration registers.

25. The system of claim 24, wherein the method further comprises:

extending, by the processor, measurement of a configuration of one or more parameters of the code-load into a third set of platform configuration registers of the security coprocessor; and generating the quote for the remote attestation further using the third set of platform configuration registers.

* * * * *